Dec. 31, 1963 M. RUDOLPH 3,115,673
METHOD AND APPARATUS FOR BLOW MOLDING PLASTIC OBJECTS
Filed May 2, 1961 4 Sheets-Sheet 2
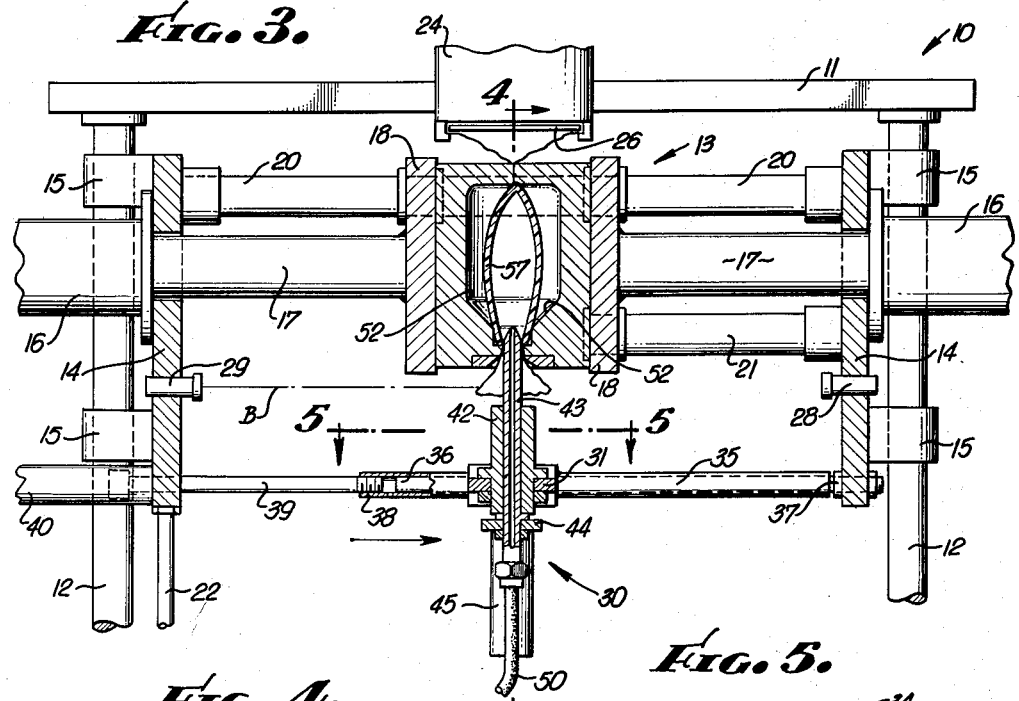
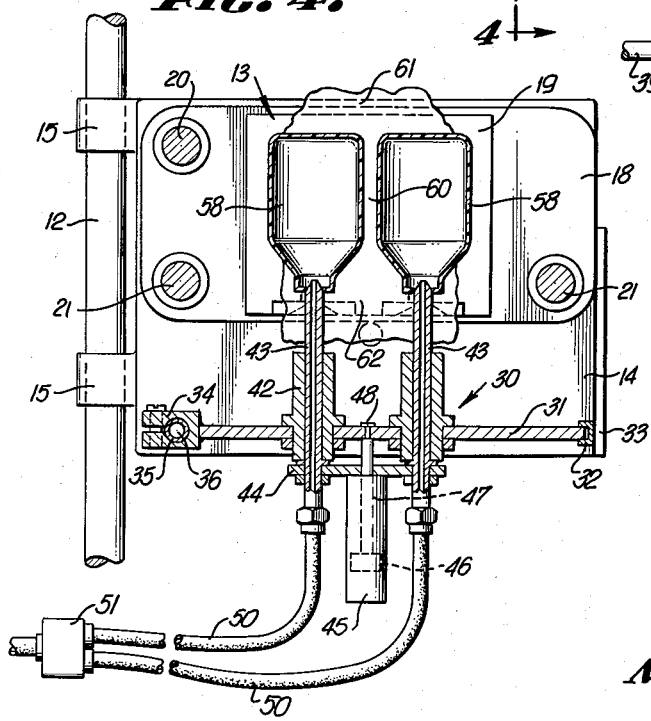
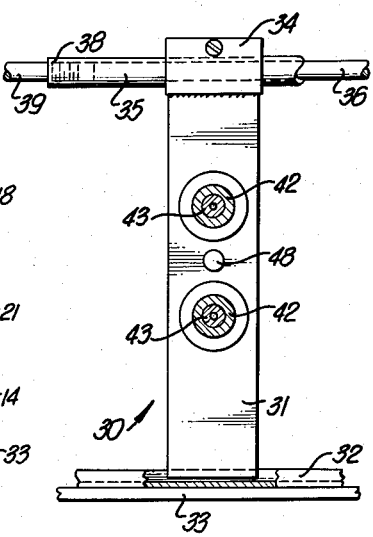
INVENTOR.
MARTIN RUDOLPH
BY
ATTORNEYS.

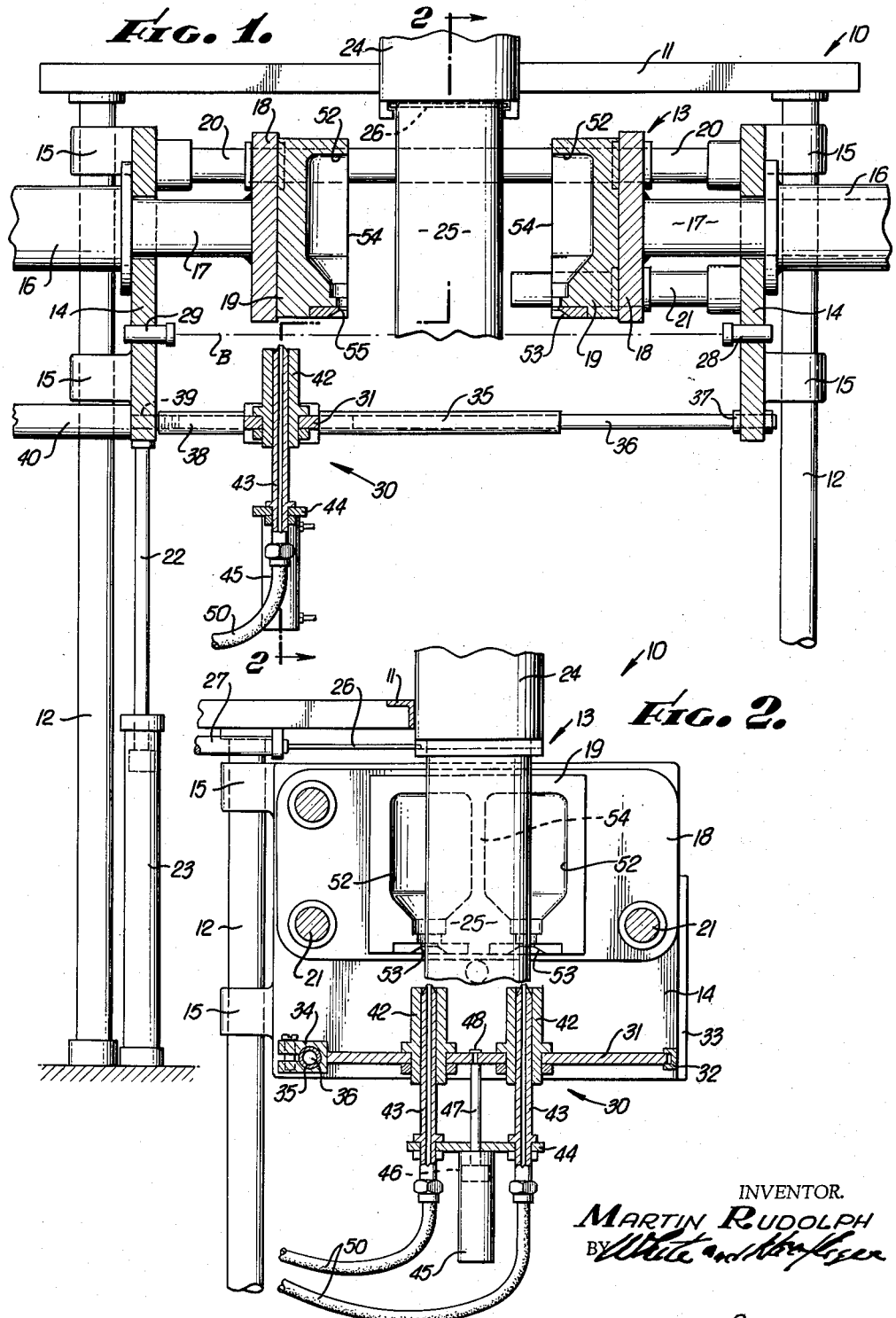

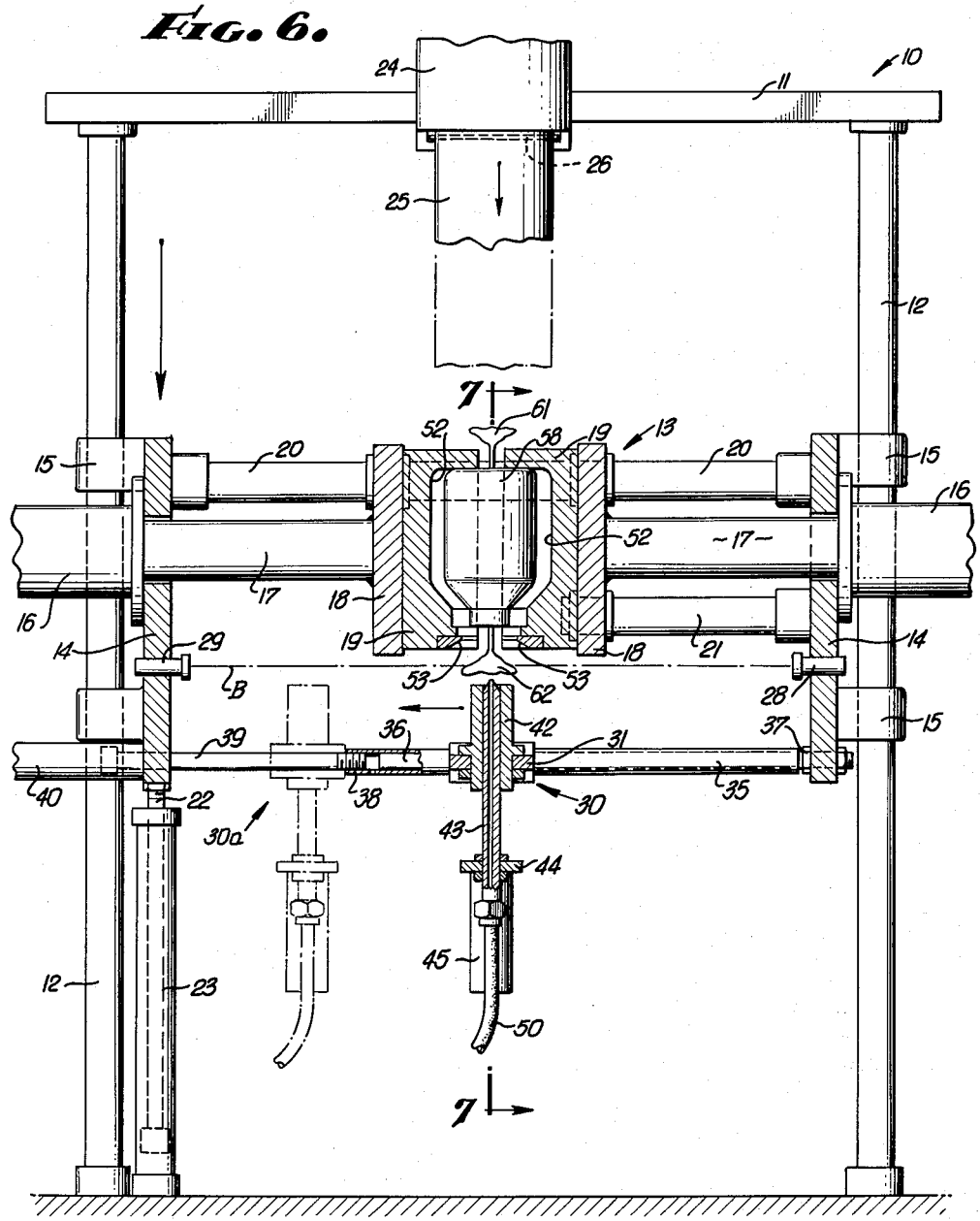

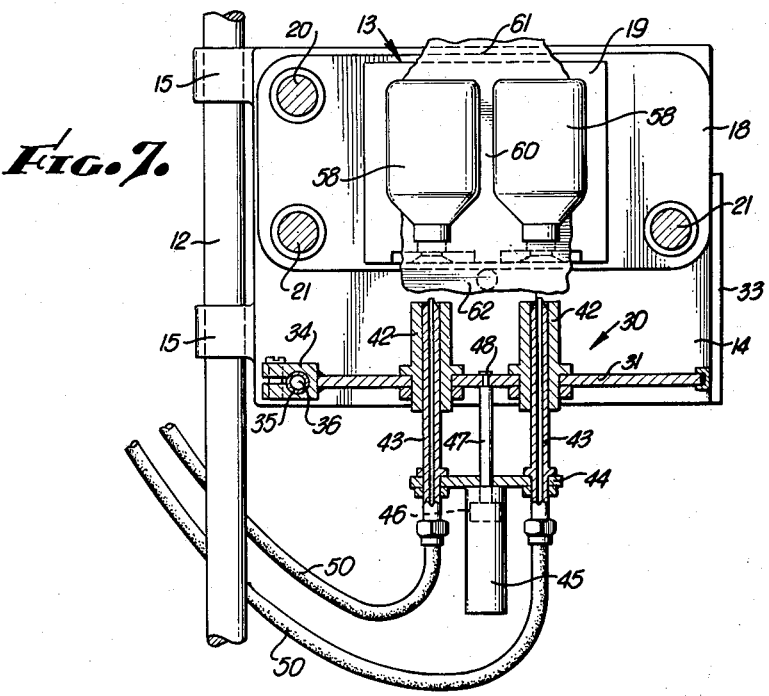
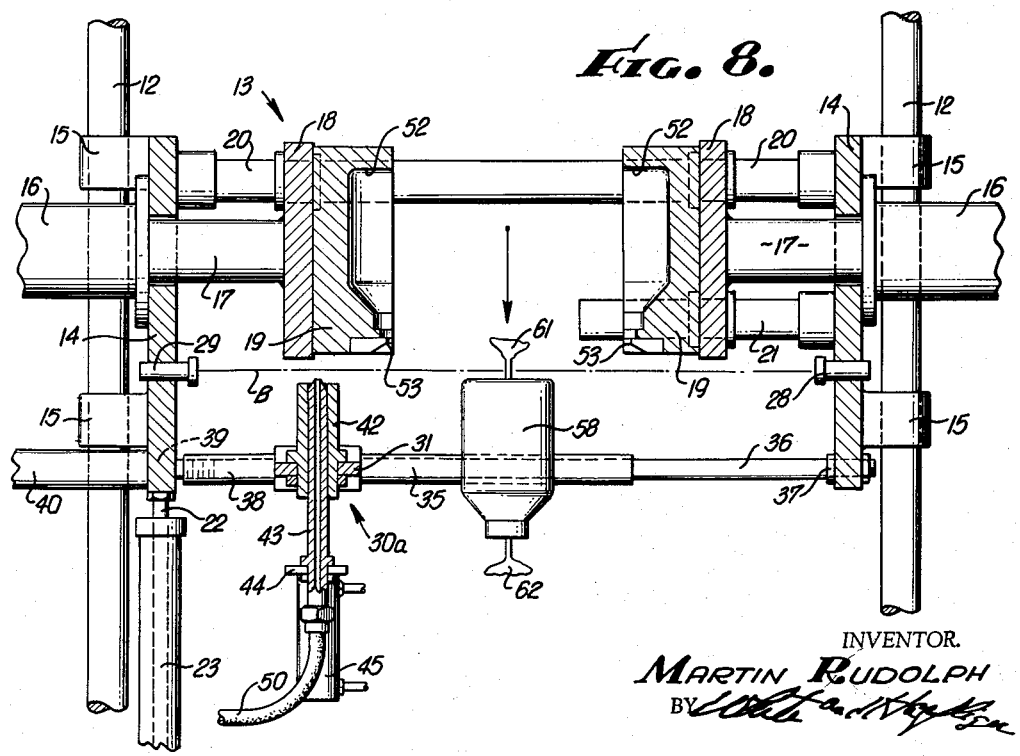

United States Patent Office 3,115,673
Patented Dec. 31, 1963

3,115,673
METHOD AND APPARATUS FOR BLOW MOLDING PLASTIC OBJECTS
Martin Rudolph, Velbert, Rhineland, Germany, assignor to Purex Corporation, Ltd., South Gate, Calif., a corporation of California
Filed May 2, 1961, Ser. No. 107,112
19 Claims. (Cl. 18—5)

This invention has to do with improvements in the blow molding of plastic objects such as bottles or other forms of containers, from suitable organic plastic materials such as linear polyethylene.

As is commonly known in the art, hollow objects may be blow molded by feeding to an appropriate mold or mold assembly, the heated and therefore expansible plastic stock, in any of various forms such as sheets or tubular extrusions, which are received within the open mold and then, upon closure of the mold, blown by internal gas pressure to the configuration of the mold. The present invention contemplates this general procedure, with the understanding that in its broader aspects, the invention contemplates feeding of the preheated plastic stock in any suitable form to the mold. As illustrative of my preferred practice, the invention will be described with reference to blow molding of successive lengths of a tubular parison, and preferably one undergoing continuous extrusion.

The invention is further and more particularly concerned with improvements in that type of operation employing a single mold, or mold assembly, which functions to blow mold successive lengths of a continuously extruding parison, in a cycle that involves reception of the parison in a movable mold assembly as first positioned, closing the mold, blowing the severed first parison length while the mold assembly is moved to a second position out of the path of the continuously extruding parison, ejecting the blown article from the mold, and then returning the mold in open condition to the first assumed position to receive the succeeding parison length. As will later appear, the mold assembly may be mounted and actuated for vertical displacement between an upper parison receiving position, and a lower blowing position at which the mold opens to permit removal or ejection of the blown object.

The invention is primarily concerned with the manner in which the object is air blown and thereafter given freedom for ejection from the open mold. Heretofore it has been proposed to blow the article by air delivery through a nozzle or mandrel entering the lower end of the parison and remaining vertically aligned with the blown article so that the latter must be displaced for ejection from the mold laterally away from above the blow nozzle. One of my primary objects is to obviate the necessity for any blown article ejecting means, by the variable positioning of the blow nozzle so that the blown article is left free to drop out of the mold.

Structurally, the invention contemplates the provision of a blow nozzle assembly mounted for shifting movement transversely of the longitudinal axis of the mold and in timed relation with opening and closing of the mold, so that the nozzle is positioned for blowing through the end of the closed mold, and thereafter the nozzle is withdrawn and shifted laterally away from the blow position, leaving the blown article free to drop out of the mold. In this connection, it is to be understood that the invention contemplates any of various known types of blow nozzle actuations in relation to the mold and its contained parison, such as projecting the nozzle into blowing relation with the parison either before, simultaneously with, or following closure of the mold. Any of these specific modes of operation may be achieved by proper timing of the nozzle projection in relation to actuation of the mold.

The stated objects of the invention, as well as various additional features and advantages, will be more clearly understood from the following description of the illustrative embodiments shown by the accompanying drawings in which:

FIG. 1 is a view showing the blow molding equipment in an up position of the mold assembly;

FIG. 2 is a section taken on line 2—2 of FIG. 1;

FIG. 3 is a view similar to FIG. 1, illustrating the mold closure about the parison at the start of the blowing cycle;

FIG. 4 is a section taken in the aspect of line 4—4 of FIG. 3, showing the containers blown to the mold configuration;

FIG. 5 is a fragmentary section taken on line 5—5 of FIG. 3;

FIG. 6 is a view similar to FIG. 1 illustrating the mold and blow nozzle positions following blowing of the containers and as the mold is partially opened;

FIG. 7 is a section on line 7—7 of FIG. 6; and

FIG. 8 is a view illustrating the fully opened mold condition and release of the blown containers.

It is explained preliminarily that while the illustrated apparatus is obviously applicable to the blowing of a single container from a single parison length, by using a single cavity mold assembly and single blow nozzle, I have chosen for purposes of illustration, and to depict what in some instances may be a preferred practice, an embodiment of the invention whereby it is possible to simultaneously form two containers in side-by-side relation from the same parison length. This particular aspect of the invention is more specifically dealt with in my co-pending application entitled Blow Molding of Plastic Objects, Serial No. 107,113, filed on an even date herewith, now abandoned.

Referring to the drawings, the equipment comprises an appropriate frame structure generally indicated at 10, the pertinent portions of which include an upper cross member 11 and a pair of supporting guide rods 12, in relation to which the mold assembly, generally indicated at 13, is mounted for vertical reciprocation in the manner hereinafter explained. The mold assembly, including its actuating parts, comprises a pair of plates 14 carrying integral sleeve bosses 15 which slide vertically along the guides 12. The plates 14 carry a pair of cylinders 16 containing piston rods 17 terminally secured to platens 18 so that by controlled fluid pressure communication to and from the cylinders 16, the platens may be reciprocated between open and closed mold conditions. The platens 18 carry sections 19 together forming a partable mold structure, the details of which will be later amplified. The platens are guided in their horizontal reciprocation by movement along suitable guides such as rod 20 passing through the platens and extending between the supports 14 as shown in FIG. 2, and along rods 21 extending through platen 18 at the right. One of the plates 14 is connected to or supported by rod 22 of a piston working in cylinder 23, into and out of which pressurized fluid is controllably delivered to raise the described assembly of supporting plates 14, platens 18 and the mold sections 19.

Positioned above and in axial alignment with the mold is a head 24 constituting, in effect, the outlet of a conventional plastic extruder which operates to extrude downwardly a tubular parison 25 of a suitable plastic, such as linear polyethylene, in sufficiently heated condition to be pneumatically expansible within and to the mold configuration. Associated with the head 24 is a transversely reciprocable knife 26 suitably actuated, as by air cylinder 27, to sever the parison 25 in a manner leaving open its severed ends. By conventional controls, well known to those familiar with the art, knife 26 is actuated to so sever the parison when the lower end of the latter extrudes downwardly through the open mold to intercept a light beam along the line B directed from light source 28 to a photo electric cell 29. This same light beam interception times closure of the mold sections 19 in a manner later explained.

The vertically reciprocating plates 14 also mount for travel therewith the laterally shiftable blow nozzle, assembly generally indicated at 30, and carried by a plate 31, one edge of which is slidable in a channel guide 32 carried by suspension arms 33 depending from the plates 14. The opposite end of plate 31 has an integral bifurcation 34 clamped to an elongated sleeve 35 slideable on rod 36 anchored at 37 to one of the plates 14. The opposite end of the sleeve attaches at 38 to rod 39 of a fluid pressure actuated piston working in cylinder 40 so that sleeve 35, plate 31 and the parts carried thereby, are horizontally shiftable between the solid and broken line positions appearing in FIG. 6, displacement to the right being limited by engagement of sleeve 35 with the rod anchorage at 37.

Plate 31 carries a pair of vertical sleeves 42 serving as guides for a pair of blow nozzles 43 attached to a common cross piece 44. The latter is integrally associated with a depending cylinder 45 containing a piston 46, the rod 47 of which is reciprocable through the plate 47 and attached at its upper end 48 to plate 31. By controlled delivery and exhaustion of pressurized actuating fluid in cylinder 45 above and below the piston 46, the blow nozzles 43 are shiftable from vertically retractable positions below the mold assembly as illustrated in FIGS. 1 and 6, to upwardly projected blowing positions within the mold-confined parison, as in FIG. 3. The supply of blowing air to the nozzles 43 through lines 50 may be intermittently continued and interrupted, respectively as the nozzles are in and out of blowing positions, by suitable control diagramatically indicated at 51.

Referring for example to FIG. 2, each of the mold sections 19 is shown to contain a pair of semi-circular cavities 52 in the shape of inverted bottles, the lower ends of the cavities having reduced neck portions 53 of any suitable shape and size according to the container design and being capable of allowing the nozzles 43 to enter and blow the parison through its lower end. The mold is so positioned that the same parison length is extruded centrally of the mold web or rib 54 between the cavities 52 so that the parison, having a diameter less than the total transverse width of the two cavities, overlaps the latter substantially equi-distant from the web 54. As the mold sections come together and squeeze the parison, the latter is progressively deflected in the plane of FIG. 2, outwardly beyond the neck portions 53 of the cavities to permit entry into the parison of the blow nozzles 43 axially aligned with the cavities.

In considering the blow molding cycle of the equipment, assume first the parts to be in the FIG. 1 position wherein the mold is open and the lower end of the parison 25 has just intercepted the light beam B. Thereupon pistons 17 are actuated to close the mold sections to their FIG. 3 position, in which the upper portion of the parison projecting through the mold is pinched together at 56. Substantially simultaneously with the mold closure, or somewhat afterward as the mold starts down, knife 26 is actuated to sever the extruded parison length openly from the succeeding parison being continuously extruded from the head 24. It is to be understood that the nozzles 43 may be projected upwardly from alignment with the mold, and at a position corresponding to FIG. 6, in any suitable relation to the mold closure, and to any suitable degree of penetration into the parison and mold cavities. Typically, piston 46 may be actuated to project the blow nozzle upwardly to their FIGS. 3 and 4 elevation just before the mold sections close together, so that the parison becomes clamped within cavities 53 about the nozzles.

Immediately after the described mold closure, parison severence and blow nozzle projection, piston 22 is actuated to lower the entire mold and blow nozzle assemblies 13 and 30 at a rate in excess of the parison extrusion rate. As the assembly starts its downward travel, air is introduced through the blow nozzles to expand the side-by-side portions of the parison within the mold cavities 52, such expansion continuing from an initial state 57 (see FIG. 3) of expansion during a first stage of downward movement to completion of the blown form 58 of the containers, as shown in FIG. 4, upon or shortly following arrival of the mold and nozzle assemblies at their lowermost positions corresponding in elevation to FIG. 6. Thereupon, the mold starts to open as in FIG. 6, piston 46 is actuated to retract downwardly the blow nozzles 43, and the piston in cylinder 40 is actuated to shift the nozzle assembly laterally from below the blown containers, as to the position 30a, see FIGS. 6 and 8. As the mold continues to open to the FIG. 8 condition, the blown containers 48, joined by flashing webs at 60, 61 and 62, between, above and below the containers, are allowed to drop down out of the molds to a receiving facility, not shown, as permitted by reason of the blow nozzles having been shifted from any position of interference with such ejection of the containers.

Following the container removal, piston 22 is actuated to return the mold and nozzle assembly to the FIG. 1 positions, whereupon the succeeding length being extruded to interception of the light beam at B, occasions in the manner explained, repetition of the described actuations of the mold and blow nozzle assemblies.

I claim:

1. The method of blow molding plastic hollow objects, that includes receiving plastic material in heated expansible condition in an open partable section mold, blowing said material to the internal configuration of the mold by closing the mold and introducing gas into said material by a blow nozzle through an end of the mold to form the hollow object, then withdrawing and shifting the nozzle laterally of the mold away from the blow position and from the blown object itself, and dropping the blown object downwardly from its blow position.

2. The method of blow molding plastic hollow objects, that includes receiving plastic material in heated expansible condition in an open partable section mold, blowing said material to the internal configuration of the mold by closing the mold and introducing gas into said material by a blow nozzle through an end of the mold to form the hollow object, then withdrawing and shifting the nozzle laterally of the mold away from the blow position and from the blown object itself, and dropping the blown object downwardly from its blow position, opening and closing the mold sections at predetermined time intervals, and controlling said lateral shifting of the blow nozzle into and away from blowing position in predetermined timed relation with said opening and closing of the mold sections.

3. The method of blow molding plastic hollow objects that includes receiving plastic material in heated expansible condition within an open partable section mold positioned so that the mold sections are shiftable horizontally between open and closed positions, blowing said material to the internal configuration of the mold by closing the mold sections and introducing gas into said material by a blow nozzle positioned laterally centrally of the mold and through one end of the mold to form the hollow object, and withdrawing and shifting the nozzle horizontally of the mold away from the blow position and from the blown material itself following said blowing of the material, and dropping the blown object downwardly from its blow position.

4. The method of blow molding plastic hollow objects that includes receiving plastic material in heated expansible condition within an open partable section mold positioned so that the mold sections are shiftable horizontally between open and closed positions, blowing said material to the internal configuration of the mold by closing the mold sections and introducing gas into said material by a blow nozzle positioned laterally centrally of the mold and through one end of the mold to form the hollow object, and withdrawing and shifting the nozzle horizontally of the mold away from the blow position and from the blown material itself following said blowing of the material, and dropping the blown object downwardly from its blow position, opening and closing the mold sections at predetermined time intervals, and controlling said horizontal shifting of the blow nozzle into and away from blowing position in predetermined time relation with said opening and closing of the mold sections.

5. The method of blow molding plastic hollow objects, that includes receiving plastic material in heated expansible condition in an open partable section mold, blowing said material to the internal configuration of the mold by closing the mold and introducing gas into said material by a blow nozzle through the bottom end of the mold to form the hollow object, then withdrawing and shifting the nozzle laterally of the mold away from the blow position and from the blown material itself, and opening the mold to allow the formed article to drop out free from interference by the nozzle to a receiving station below the mold.

6. The method of blow molding plastic hollow objects, that includes receiving plastic material in heated expansible condition in an open partable section mold, blowing said material to the internal configuration of the mold by closing the mold and introducing gas into said material by a blow nozzle through the bottom end of the mold to form the hollow object, then withdrawing and shifting the nozzle laterally of the mold away from the blow position and from the blown material itself, opening the mold to allow the formed article to drop out free from interference by the nozzle to a receiving station below the mold, and timing said shifting of the nozzle in predetermined relation with opening and closing of the mold.

7. The method of blow molding plastic hollow objects that includes receiving plastic material in heated expansible condition within an open partable section mold positioned so that the mold sections are shiftable horizontally between open and closed positions, blowing said material to the internal configuration of the mold by closing the mold sections and introducing gas into said material by a blow nozzle positioned between the bottoms of the mold sections to form the hollow object, opening said sections, withdrawing the nozzle and shifting the withdrawn nozzle horizontally away from the blown article itself to permit the article to drop out of the mold free from interference by the nozzle to a receiving station below the mold, and thereafter returning the nozzle to blowing position in predetermined relation to the mold closure.

8. The method of claim 7, in which said plastic material is in tubular form and said nozzle enters the lower end thereof.

9. The method of claim 1, in which the mold and nozzle are moved vertically together between an upper plastic material receiving position and a lower article ejecting position.

10. The method of claim 7, in which the mold and nozzle are moved vertically together between an upper plastic material receiving position and a lower article ejecting position.

11. The method of claim 1, in which the plastic material is in the form of a single tube and the mold contains two side-by-side cavities both receiving portions of the same tube, there being two blow nozzles for projecting gas into the tube portions in the respective cavities.

12. The method of claim 7, in which the plastic material is in the form of a single tube and the mold contains two side-by-side cavities both receiving portions of the same tube, there being two blow nozzles for projecting gas into the tube portions in the respective cavities.

13. Apparatus for blow molding plastic hollow articles, comprising a mold having sections horizontally shiftable between open and closed positions, means for supplying heated and expansible plastic material between the open mold sections, a nozzle positioned to blow gas through one end of the mold into said material to expand it to the internal configuration of the mold to form the hollow object, and means for shifting said nozzle horizontally away from its blowing position and from the blown object itself following completion of the blowing operation, there being free fall space below the mold when the nozzle is so shifted to allow the blown object to fall from the blow location to a receiving station free and clear of the mold.

14. Apparatus for blow molding plastic hollow articles, comprising a mold having sections horizontally shiftable between open and closed positions, means for supplying heated and expansible plastic material between the open mold sections, a nozzle positioned to blow gas through one end of the mold into said material to expand it to the internal configuration of the mold to form the hollow object, means for shifting said nozzle horizontally away from its blowing position and from the blown object itself following completion of the blowing operation, and means for vertically displacing said nozzle into and out of blowing relation with the mold, there being free fall space below the mold when the nozzle is so shifted to allow the blown object to fall from the blow location to a receiving station free and clear of the mold.

15. Apparatus for blow molding plastic hollow articles, comprising a mold having sections horizontally shiftable between open and closed positions, means for downwardly extruding a heated and expansible tubular parison of plastic material for reception between the mold sections, a nozzle positioned to blow gas through the bottom end of the mold into said parison to expand it to the internal configuration of the mold to form the hollow object, means mounting said nozzle for horizontal shifting movement away from below the blown article itself, and means for shifting said nozzle in timed relation with opening and closing of the mold so that the nozzle is shifted into blowing position when the mold sections are closed and is shifted away when the sections open to allow the article to drop out of the mold, there being free fall space below the mold when the nozzle is so shifted to allow the blown object to fall from the blow location to a receiving station free and clear of the mold.

16. Apparatus according to claim 15, including also means for shifting the blow nozzle axially of the mold.

17. Apparatus according to claim 15, including also means for shifting the mold and nozzle between an upper parison receiving position and a lower blown article ejecting position.

18. Apparatus according to claim 15, in which the mold has a pair of side-by-side cavities receiving the same parison length, and including a pair of the shiftable blow nozzles projectable into the lower ends of said cavities.

19. Apparatus according to claim 17, in which the mold has a pair of side-by-side cavities receiving the same parison length, and including a pair of the shiftable blow nozzles projectable into the lower ends of said cavities.

References Cited in the file of this patent

UNITED STATES PATENTS

| | | |
|---|---|---|
| 2,943,349 | Adams et al. | July 5, 1960 |
| 2,975,473 | Hagen et al. | Mar. 21, 1961 |
| 2,994,103 | Schaich | Aug. 1, 1961 |
| 3,000,051 | Schaich | Sept. 19, 1961 |
| 3,040,380 | Alosky | June 26, 1962 |

FOREIGN PATENTS

| | | |
|---|---|---|
| 697,326 | Great Britain | Sept. 23, 1953 |